US008172162B2

(12) United States Patent
Gopalan et al.

(10) Patent No.: US 8,172,162 B2
(45) Date of Patent: May 8, 2012

(54) HIGH EFFICIENCY, MULTIPLE THROAT FLUIDIC OSCILLATOR

(75) Inventors: Shridhar Gopalan, Westminster, MD (US); Gregory Russell, Catonsville, MD (US); Daniel Eugene Steerman, Harpers Ferry, WV (US)

(73) Assignee: Bowles Fluidics Corp., Columbia, MD (US)

( * ) Notice: Subject to any disclaimer, the term of this patent is extended or adjusted under 35 U.S.C. 154(b) by 279 days.

(21) Appl. No.: 12/380,880

(22) Filed: Mar. 3, 2009

(65) Prior Publication Data

US 2009/0236449 A1 Sep. 24, 2009

Related U.S. Application Data

(63) Continuation-in-part of application No. 11/245,396, filed on Oct. 6, 2005, now Pat. No. 7,677,480, and a continuation-in-part of application No. 11/805,802, filed on May 24, 2007, now abandoned.

(51) Int. Cl.
B05B 1/08 (2006.01)
B05B 1/10 (2006.01)
B05B 1/02 (2006.01)
(52) U.S. Cl. .................. 239/589.1; 239/284.1
(58) Field of Classification Search .............. 239/11, 239/284.1, 284.2, 589, 589.1; 137/808, 809, 137/811, 813, 814
See application file for complete search history.

(56) References Cited

U.S. PATENT DOCUMENTS

| 3,563,462 A | 2/1971 | Bauer | 239/456 |
|---|---|---|---|
| 3,741,481 A * | 6/1973 | Bauer | 239/589.1 |
| 4,052,002 A | 10/1977 | Stouffer | 239/4 |
| 4,151,955 A | 5/1979 | Stouffer | 239/11 |
| 4,157,161 A | 6/1979 | Bauer | 239/11 |
| 4,231,519 A | 11/1980 | Bauer | 239/4 |
| 4,463,904 A | 8/1984 | Bray | 239/284 |
| 4,508,267 A | 4/1985 | Stouffer | 239/11 |
| 4,562,867 A | 1/1986 | Stouffer | 137/811 |
| 4,645,126 A | 2/1987 | Bray | 239/11 |
| 5,035,361 A | 7/1991 | Stouffer | 239/589.1 |
| 5,181,660 A | 1/1993 | Stouffer et al. | 239/589.1 |
| 5,213,269 A | 5/1993 | Srinath et al. | 239/589.1 |
| 5,749,525 A | 5/1998 | Stouffer | 239/284.1 |
| 5,820,034 A | 10/1998 | Hess | 239/589.1 |
| 5,845,845 A | 12/1998 | Merke et al. | 239/1 |
| 5,971,301 A | 10/1999 | Stouffer et al. | 239/589.1 |
| 6,062,491 A | 5/2000 | Hahn et al. | 239/284.2 |
| 6,186,409 B1 | 2/2001 | Srinath et al. | 239/1 |
| 6,240,945 B1 | 6/2001 | Srinath et al. | 137/14 |
| 6,253,782 B1 | 7/2001 | Raghu | 137/14 |
| 6,464,150 B1 | 10/2002 | Zimmer et al. | 239/284.1 |
| RE38,013 E | 3/2003 | Stouffer | 239/284.1 |
| 7,014,131 B2 | 3/2006 | Berning et al. | 239/589.1 |
| 7,111,800 B2 | 9/2006 | Berning et al. | 239/589.1 |
| 2004/0227021 A1 | 11/2004 | Romack et al. | 239/589.1 |
| 2006/0043110 A1 | 3/2006 | Miyauchi | 222/129.1 |
| 2006/0108442 A1 | 5/2006 | Russell et al. | 239/102.1 |
| 2006/0226266 A1 | 10/2006 | Russell et al. | 239/589.1 |
| 2007/0295840 A1 | 12/2007 | Gopalan et al. | 239/589.1 |

* cited by examiner

Primary Examiner — Darren W Gorman
(74) Attorney, Agent, or Firm — J. A. McKinney

(57) ABSTRACT

An improved fluidic oscillator, that operates on a pressurized liquid flowing through the oscillator to generate a liquid jet that flows into the surrounding gaseous environment to form of an oscillating spray of liquid droplets, includes: a member into which is fabricated a two-portion, flow channel, with its first portion configured so as to create the flow phenomena in the member that yields the spray's oscillating nature, and its second portion includes a splitter that is used to divide the jet into component sprays whose centerlines assume a specified yaw or pitch angle relative to the centerline of the oscillator.

20 Claims, 5 Drawing Sheets

VIEW A-A

VIEW A-A

VIEW B-B

HIGH EFFICIENCY, MULTIPLE THROAT FLUIDIC OSCILLATOR

CROSS-REFERENCE TO RELATED APPLICATION

This application is a continuation-in-part of the present Assignee's pending patent applications U.S. Ser. No. 11/245,396—filed Oct. 6, 2005 now U.S. Pat. No. 7,677,480 and U.S. Ser. No. 11/805,802—filed May 24, 2007 now abandoned. The teachings of these prior patent applications are incorporated by reference herein and to the extent that they do not conflict with the teachings herein.

BACKGROUND OF THE INVENTION

1. Field of the Invention

This invention relates to fluid handling processes and apparatus. More particularly, this invention relates to fluidic oscillators and new methods and apparatus for improving their effective operating efficiencies.

2. Description of the Related Art

Fluidic inserts or oscillators are well known for their ability to provide a wide range of distinctive liquid sprays into surrounding ambient gaseous environments. The distinctiveness of these sprays is due to the fact that they are characterized by being oscillatory in nature, as compared to the relatively steady state flows that are emitted from standard spray nozzles.

Figure 5:
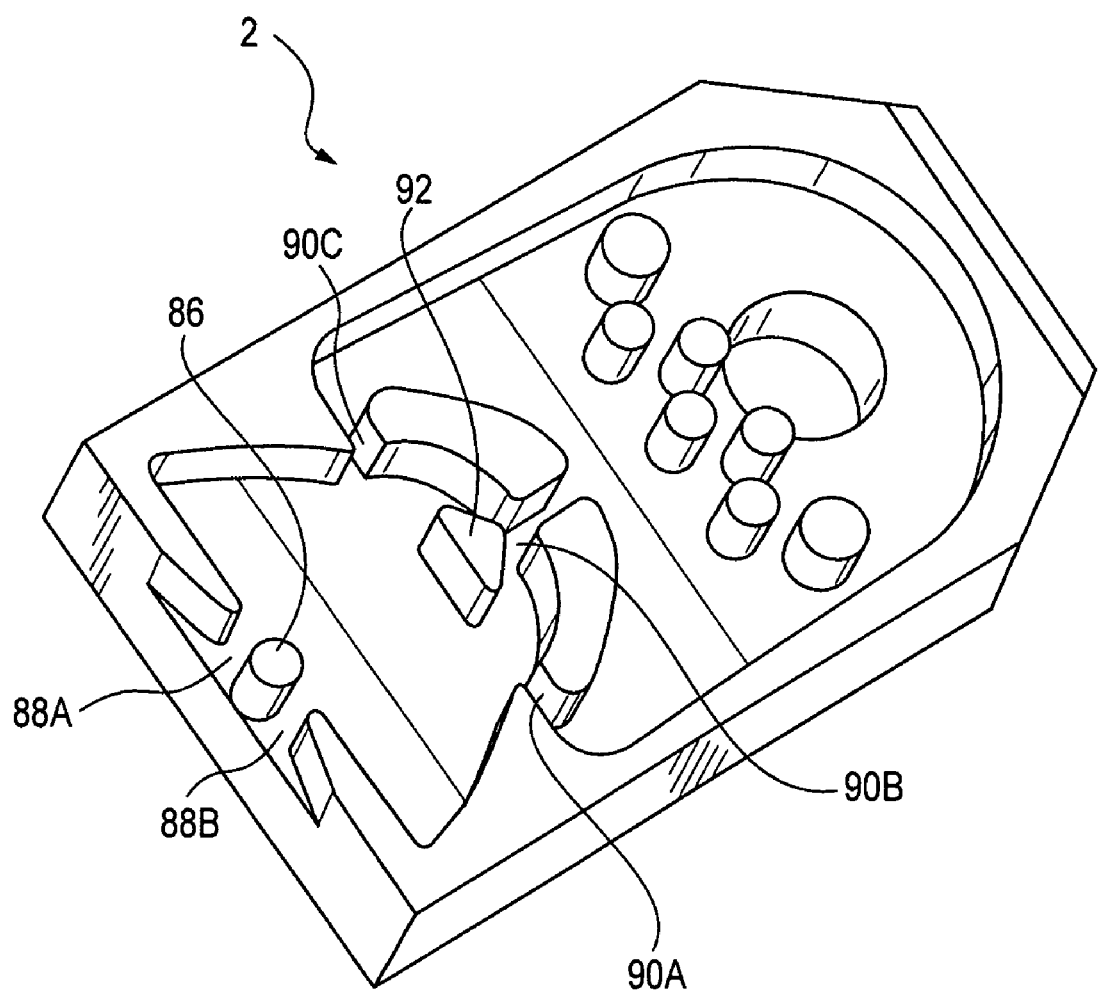
Figure 6:
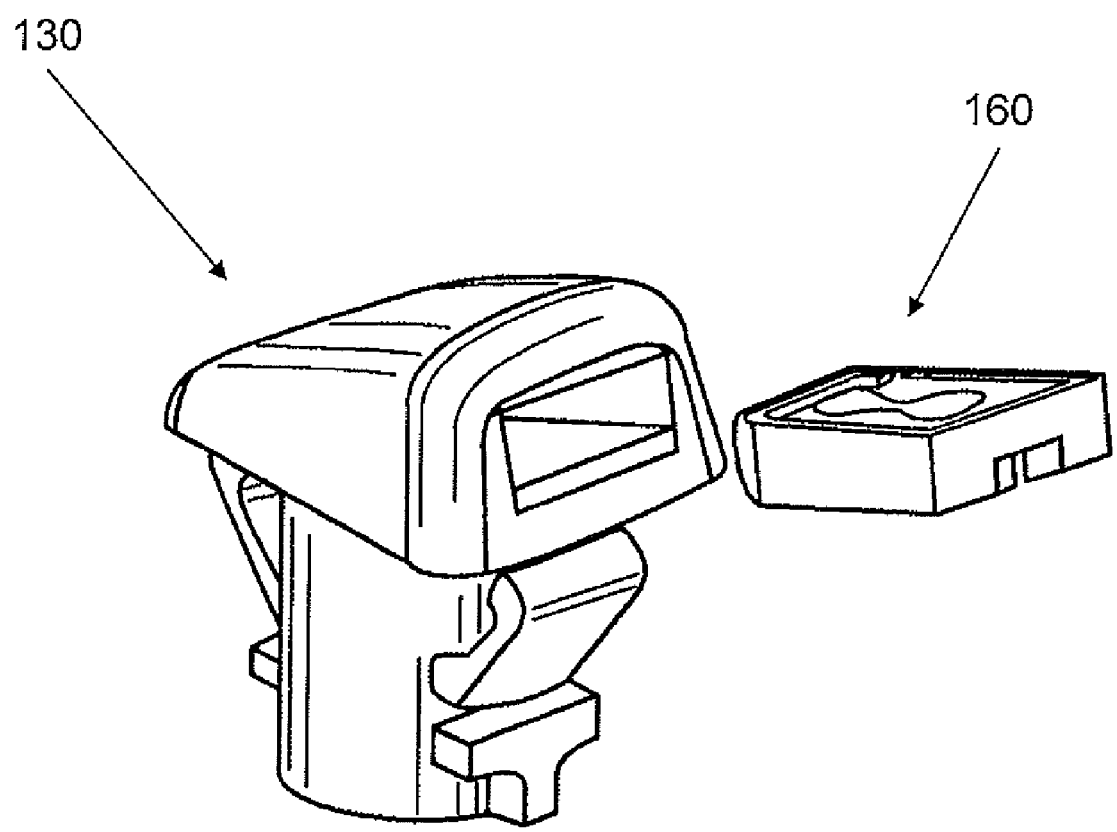

FIG. 5 of the present Assignee's (USPN) U.S. Pat. No. 4,052,002 illustrates the oscillatory nature of the spray from a typical fluidic oscillator. It shows what can be considered to be the essentially temporally varying, two-dimensional, planar flow pattern of a liquid jet or spray that issues from the oscillator into a surrounding gaseous environment and breaks into droplets which are distributed transversely to the jet's general direction of flow. Such spray patterns may be described by the definable characteristics of their droplets (e.g., the volume flow rate of the spray, the spray's area of coverage or its fan angle, the spatial distribution of droplets in planes perpendicular to the direction of flow of the spray and at various distances in front of the oscillator's outlet, the average droplet velocities, the average size of the droplets, and the frequency at which the droplets impact on an obstacle in the path of the spray).

A fluidic insert is generally thought of as a thin, rectangular member that is molded or fabricated from plastic and has an especially-designed, uniform depth, liquid flow channel or fluidic circuit fabricated into either its broader top or bottom surface, and sometimes both. Pressurized liquid enters such an insert and is sprayed from it. See, for example the fluidic insert (18) and housing (10) in FIG. 1 of the present Assignee's U.S. Pat. No. 7,014,131.

There are many well known designs of fluidic circuits that are suitable for use with such fluidic inserts. Many of these have some common features, including: (a) at least one power nozzle configured to greatly accelerate the movement of the liquid that flows under pressure through the insert so that it separates from the walls downstream of the power nozzle so as to form an essentially "free" jet downstream of the power nozzle (i.e., "free" in that the jet as it exits the power nozzle is not attached to the sidewalls that are attached to the edges of the power nozzle), (b) an interaction chamber through which the liquid flows and in which the flow phenomena (e.g., intermittent, alternating vortices in side-by-side locations within the chamber) is initiated that will eventually lead to the spray from the insert being of an oscillating nature, (c) a liquid inlet, (d) a pathway that connects the inlet and the power nozzle/s, and (e) one or more outlets or throats from which the liquid sprays from the insert—see U.S. Pat. No. 4,231,519 for an example of a multiple throat oscillator.

Examples of fluidic circuits may be found in many patents, including the present Assignee's U.S. Pat. No. 3,563,462 (Bauer), U.S. Pat. No. 4,052,002 (Stouffer & Bray), U.S. Pat. No. 4,151,955 (Stouffer), U.S. Pat. No. 4,157,161 (Bauer), U.S. Pat. No. 4,231,519 (Stouffer), which was reissued as RE 33,158, U.S. Pat. No. 4,508,267 (Stouffer), U.S. Pat. No. 5,035,361 (Stouffer), U.S. Pat. No. 5,213,269 (Srinath), U.S. Pat. No. 5,971,301 (Stouffer), U.S. Pat. No. 6,186,409 (Srinath) and U.S. Pat. No. 6,253,782 (Raghu).

Most fluidic oscillators and fluidic circuits are fabricated so as to have lateral symmetry about their centerlines. However, there are instances in which asymmetries are built into fluidic oscillators. For example, when it is desired to impose a yaw angle or outward or lateral horizontal deflection on the centerline of the spray that flows from an oscillator, it is known to fabricate such an oscillator with an asymmetry relative to its centerline. See the present Assignee's U.S. Pat. No. 6,253,782.

As fluidic oscillators have continued to be used in more types of industrial applications, the need has been identified to improve upon their designs so as to enable them to achieve greater operating efficiencies and flow performances (e.g., higher mean exit velocities, larger fan angles and more uniform spatial distribution of their droplets). For example, for a certain size oscillator operating at a specified pressure to yield a spray having a required fan angle, a means is needed to modify such an oscillator so that its spray also has a higher mean velocity at the oscillator's exit.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide an improved fluidic oscillator that can operate more efficiently than prior fluidic oscillators.

It is also an object of the present invention to provide fluidic oscillators that can provide specific types of desired sprays (e.g., those having higher mean exit velocities, larger fan angles and more uniform spatial distribution of their droplets) that have heretofore not been achievable with conventional fluidic technology.

It is a further object of the present invention to provide improved and more versatile fluidic inserts and their enclosures which are ideally designed for a wider, more demanding range of windshield washer applications.

It is an additional object of the present invention to provide improved enclosures and fluidic inserts that are ideally designed for an assortment of commercial cleaning applications.

It is an object of the present invention to provide enclosures for otherwise standard fluidic oscillators that allow a user to better direct and control the location of the areas being wetted by the sprays from such devices.

These and other objects and advantages of the present invention will become readily apparent as the invention is better understood by reference to the accompanying summary, drawings and the detailed description that follows.

SUMMARY OF THE INVENTION

Recognizing the need for the development of improved fluidic oscillators and their enclosures, the present invention is generally directed to satisfying the needs set forth above and overcoming the limitations seen in the prior art devices and methods.

In accordance with the present invention, a fluidic oscillator (that operates on a pressurized liquid flowing through it to generate an oscillating spray of liquid droplets into a surrounding ambient environment and wherein the spray is characterized by properties such as its fan angle, mean exit velocity and the uniformity of the spatial distribution of its droplets) of the type having a centerline, an interaction chamber and a means for inducing oscillations in the liquid flowing through the chamber, and where the chamber has sidewalls that extend downstream and converge towards the oscillator's centerline so as to form an outlet for the oscillator, is improved upon by modifying it such that it includes: (1) a splitter having a generally flat surface with a first and second edge and wherein its flat surface is generally in the upstream direction towards its interaction chamber, (2) wherein its outlet has a first and a second edge, each of which are laterally spaced away from the oscillator's centerline and serve to define an oscillator outlet plane that is generally perpendicular to the oscillator's centerline, the first splitter edge situated a first specified distance away from the oscillator's outlet plane and the second splitter edge situated a second specified distance away from the oscillator's outlet plane, (3) the first splitter edge cooperating with the outlet's first edge to cause a portion of the liquid that flows through the outlet to split into a first component spray that flows between the first splitter and outlet edges, and with this first component spray having a centerline that has a herein defined imposed, first splitter angle relative to the oscillator's centerline, (4) the second splitter edge cooperating with the outlet's second edge to cause a portion of the liquid that flows through the outlet to split into a second component spray that flows between the second splitter and outlet edges, and with this second component spray having a centerline that has a herein defined imposed, second splitter angle relative to the oscillator's centerline, and (5) wherein these imposed splitter yaw angles are chosen so as alter the characterizing properties of the resulting oscillating spray so that at least one of them assumes a desired value.

Additionally, the present invention may take the form of an enclosure for a fluidic oscillator, with this enclosure including: (1) a body having interior and exterior surfaces, with a portion of the body's interior surface configured to attach to the oscillator's outlet boundary surface so as to form an enclosed pathway for the liquid to flow through the enclosure, and (2) wherein a portion of this body's interior surface is configured so as to provide the heretofore described splitter that is used to split the flow into component sprays having imposed splitter angles.

Thus, there has been summarized above, rather broadly and understanding that there are other preferred embodiments which have not been summarized above, the present invention in order that the detailed description that follows may be better understood and appreciated. There are, of course, additional features of the invention that will be described hereinafter and which will form the subject matter of the later presented claims to this invention.

BRIEF DESCRIPTION OF THE DRAWINGS

FIG. 1 shows an illustrative two-dimensional, preferred embodiment of the present invention.

FIG. 2A (perspective)-2B (vertical cross-sectional) show a preferred embodiment of the present invention in the form of a housing which has an especially configured front wall or face into which are molded a two-tiered and three-part throat (i.e., a single upper and two lower throats that are created by the use of a splitter downstream of the interaction chamber's lower outlet plane) followed by separate expansion passages. From the upper outlet there issues a spray that has a fan angle that is within the normal range (60-120 degrees), while the lower outlet issues a two-component spray whose total overall fan angle is considerably larger than normal (140-160 degrees) due to the splitter's imposed splitter yaw angles.

FIGS. 3A (vertical cross-sectional) and 3B (downward cross-sectional of the lower region of the two-tiered sprayer housing seen in FIG. 2) show the splitter yaw angles that are imposed on the component sprays of this configuration.

FIGS. 4A-4C show a preferred embodiment of the present invention in the form of a fluidic insert which has an especially configured front wall or face into which is molded a single upper throat and, in its lower part, a downstream splitter that creates two effective lower throats that yield two component sprays that each have the same imposed splitter yaw angle.

FIG. 5 shows a preferred embodiment of the present invention that utilizes a downstream, round-shaped splitter to create two effective yawed throats, with each issuing a component spray that has an imposed splitter yaw angle. The upstream fluidic circuitry is also different in that it takes the form of what is known as a "three-jet, island" oscillator as compared to the "two-jet" or "mushroom" oscillator shown in FIGS. 1-4.

FIG. 6 shows an automotive windshield washing housing 130 that is able to carry the improved fluidic oscillator 160.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

A common problem encountered in developing and producing fluidic oscillators or inserts for use in automotive windshield applications is designing a fluidic circuit which can give the desired spray characteristics (e.g., at flow rates of 400 ml/minute and operating pressures of 9 psig, uniform coverage with spray droplets of an 80 cm wide, target area located approximately 25 cm or further in front of the sprayer) and which can be fitted into a housing which is very limited on its allowable size. Because such housings often are situated in locations on an automobile's hood that are quite visible, their allowable dimensions are often dictated by aesthetic considerations (e.g., typical acceptable widths are on the order of 10-12 mm). The consequence of these constraints is that the spray from the windshield washers situated in such housings must have a comparative large horizontal fan angle, $\phi$ (i.e., defined by the lateral or horizontal boundaries of the region wetted by the spray), as well as large an exit velocity as possible so that its droplets can overcome the air drag that is placed on the spray's droplets by the oncoming wind created by the car's forward speed.

FIG. 1 shows an illustrative two-dimensional, preferred embodiment of the present invention. It is an improved fluidic oscillator 2 that operates on a pressurized liquid flowing through it to generate an oscillating spray of liquid droplets into a surrounding gaseous environment. The resulting overall spray is characterized by properties such as its overall horizontal fan angle, $\phi$, mean exit velocity, $V_E$, and the uniformity of the spatial distribution of its droplets.

This oscillator 2 is of the type that has a centerline, $C_L$, and a pair of power nozzles 4, 6 (i.e., a means for inducing downstream oscillations in the liquid) that form from each of them a "free" jet (i.e., "free" in that the jet as it exits the power nozzle is not attached to the sidewalls that are attached to the edges of the power nozzle) that issues into an interaction chamber 8 through which the liquid flows and in which the flow phenomena (e.g., intermittent, alternating vortices in side-by-side locations within the chamber) is initiated that eventually leads to the spray from the oscillator or insert being of an oscillating nature.

It should be noted that while this embodiment uses a fluidic circuit that utilizes a pair of power nozzles as its means for generating the intermittent, alternating vortices in the oscillator's interaction chamber, there are many more types of fluidic circuits that could alternatively have been used in the present embodiment (see discussion of prior art) and all of these should be considered as part of the disclosure of the present invention.

This invention's interaction chamber is seen to have sidewalls 10, 12 that extend downstream and converge towards the oscillator's centerline so as to form an outlet 14 for the oscillator. This outlet can be considered to have a first 16 and a second 18 edge that are laterally spaced away from the oscillator centerline's and serve to define an oscillator outlet plane 20 that is generally perpendicular to the oscillator's centerline.

A novel splitter 22 (in this case a horizontal splitter, since the splitter splits the flow into right and left horizontally, oriented spray components) is seen to be located, in this instance, a short distance downstream of the oscillator's outlet plane 20. This splitter has a generally flat surface 24 that faces primarily in the upstream direction towards the oscillator's interaction chamber 8. The splitter also has an outer first (or right side) 26 and second (or left side) 28 edge, each of which is situated a specified first or second distance $d_1$ or $d_2$ downstream of the oscillator's outlet plane.

Depending on the width of the interaction chamber's outlet and the splitter's width, the splitter's first edge 26 is seen to be a specified distance or width $w_1$ away from the chamber's first outlet edge 16. These edges are seen to form an effective first throat for the oscillator that causes a portion of the liquid that flows through the outlet to split into what we have observed to be a first (or right side) component spray that flows from this first throat. Similarly, on the left side of this oscillator we see that splitter's second edge 28 is a specified distance or width $w_2$ away from the chamber's second outlet edge 18 so as to form an effective second throat for the oscillator that causes the remaining portion of the liquid that flows through the outlet to issue a second (or left side) component spray from the oscillator's second effective throat.

For a wide range of operating conditions, we have experimentally (since the sprays oscillate at a prescribed frequency, one can use a stroboscope operating at this same frequency to illuminate the spray so as to identify the position of its outer boundaries) observed that this first component spray has a centerline $C_{L1}$ that is normal to a straight line extending between this throat's edges 16, 26. Thus, we observed that our use of this splitter in its current orientation is effectively imposing a first splitter (yaw) angle, $\gamma_1$, on its component spray and that $\sin \gamma_1 = d_1/w_1$.

Similarly, on the left side of FIG. 1 we also see an effective second throat from which issues a second component spray that has a centerline $C_{L2}$ that is normal to a straight line extending between this throat's edges 18, 28 and that this second component spray has an imposed second splitter (yaw) angle, $\gamma_2$, and that $\sin \gamma_2 = d_2/w_2$.

As a result of our experimentation with a wide range of oscillators having varying sized power nozzles, outlets, splitters and splitter orientations, we have discovered that certain splitter locations are quite effective for yielding some rather surprising and advantageous spray phenomena. For example, we have observed that the improved oscillators (i.e., "split throat" oscillators) of the present invention are capable of achieving:

(1) Larger overall horizontal fan angles, at the same Area Ratios (where Area Ratio=TA/PA, and PA=the sum of the area of power nozzles 4 and 6; TA=the sum the area of effective first and second throats created by the splitter) than standard oscillators. This is important since it is often an oscillator's Area Ratio that usually determines the required lateral dimension or width of an oscillator's interaction chamber (the widest part of the oscillator) and for which there is always in automotive or windshield washer applications a preference to make this width as small as possible so as to reduce the visual impact that such oscillators have on the appearance of an automotive hood on which they are mounted. Typical imposed splitter yaw angles to achieve these larger overall fan angles are usually in the range of 5 to 45 degrees.

(2) Higher oscillator exit velocities. For example, for a standard, two power nozzle, mushroom oscillator, it is known that to achieve a targeted 90 degree fan angle at a flow rate of 1000 mL/min and at 30 psig, one utilizes an oscillator having power nozzle and throat areas of 1.08 $mm^2$ (PA) and 1.59 $mm^2$ (TA), respectively. Dividing this flow rate by the area of its throat gives an average exit velocity of 10.5 m/s.

Meanwhile, we have seen that an improved oscillator of the present invention can achieve such an overall spray angle in either of two ways. It can impose a splitter yaw angle of 22.5 degree and utilize power nozzles and an appropriate sized and oriented splitter such that its power nozzle and throat areas are 1.44 $mm^2$ and 1.22 $mm^2$ respectively. Its average exit velocity is then seen to be 13.6 m/s, a 30% increase over that achieved with the standard mushroom.

Alternatively, the present invention can impose a splitter yaw angle of 27.5 degree and utilize power nozzles and an appropriate sized and oriented splitter such that its power nozzle and throat areas are 1.60 $mm^2$ and 1.07 $mm^2$, respectively, to yield an exit velocity of 15.6 m/s, a 49% increase over that achieved with the standard mushroom.

Note that in this instance, there will be a 20 degree gap angle between the inner edges or boundaries of the components sprays. Such a situation can yield an overall spray that will show some differences in the uniformity of the downstream spatial distribution of its droplets. However, when such differences can be accommodated (e.g., in windshield washer applications, where a high exit velocity is critical to combat the spray depressions experienced during the periods when the automobile is at high speeds), the utilization of such a splitter proves to be a very effective means for achieving higher oscillator exit velocities.

In additional experiments with the present invention, it was found possible to actually place such a splitter in front of the interaction chamber's outlet plane 20. This resulted in situations in which the component sprays were actually yawed inwards and towards the oscillator's centerline and the observed gap angles were negative, indicating an overlapping of the component sprays as the flowed downstream.

Still further experiments with the present invention utilized splitters in which $d_1$ did not equal $d_2$ and/or $w_1$ did not equal $w_2$. All of these experiments showed related results in which the imposed yaw angles were seen to significantly impact the properties of the resulting component sprays.

Figure 1:
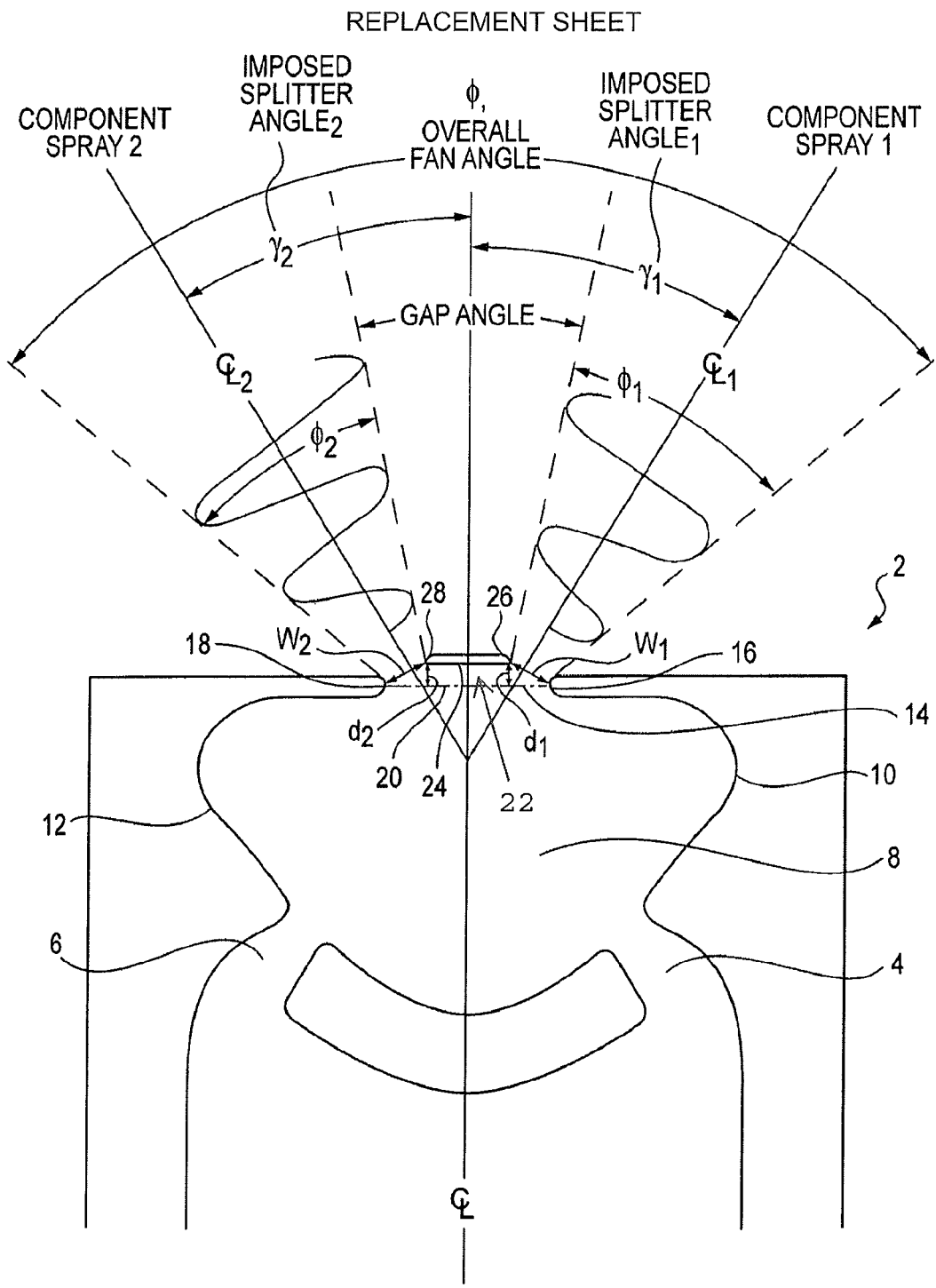

While FIG. 1 shows the present invention utilizing only a single horizontal splitter (i.e., it splits the flow horizontally into yawed right- and left-side component sprays), it should be recognized that the scope of the present invention is such as to cover and include the use of a vertical splitter whose edges are electively downstream of the oscillator's outlet plane to split the flow from the oscillator outlet into a vertical, two-tiered, pitched (since we defined sprays whose centerlines were horizontally deflected to have been yawed, we refer to sprays whose centerlines are vertically deflected as having imposed "pitch" angles), upper and lower component sprays. The use of combinations (i.e., a vertical splitter with a horizontal splitter in its lower region) of such splitters then allows for the creation of tailored sprays that have three of more spray components.

Alternatively, a vertical splitter can be oriented such that its edges lie in the plane of outlet and still used to split the flow at the oscillator's outlet into a novel two-tiered, upper and lower component sprays whose centerlines are not pitched with respect to that of the oscillator's centerline.

Additionally, those who are familiar with fluidic oscillator technology will recognize that the housings or enclosures which are used with them are often a key component in the design of the overall assemblies in which fluidic oscillators are employed. See, for example, the fluidic insert or oscillator (18) and housing (10) in FIG. 1 of the present Assignee's U.S. Pat. No. 7,014,131.

Since it is known to construct such housings with a fluidic circuitry element fabricated into them, and since the splitter of the present invention can be considered as another type of "fluidic circuitry" element, the experimental analysis of the present invention was extended to investigate the impact that such a splitter could have if it were to be a part of the liquid flow path that is fabricated into such housings.

Figure 2A:
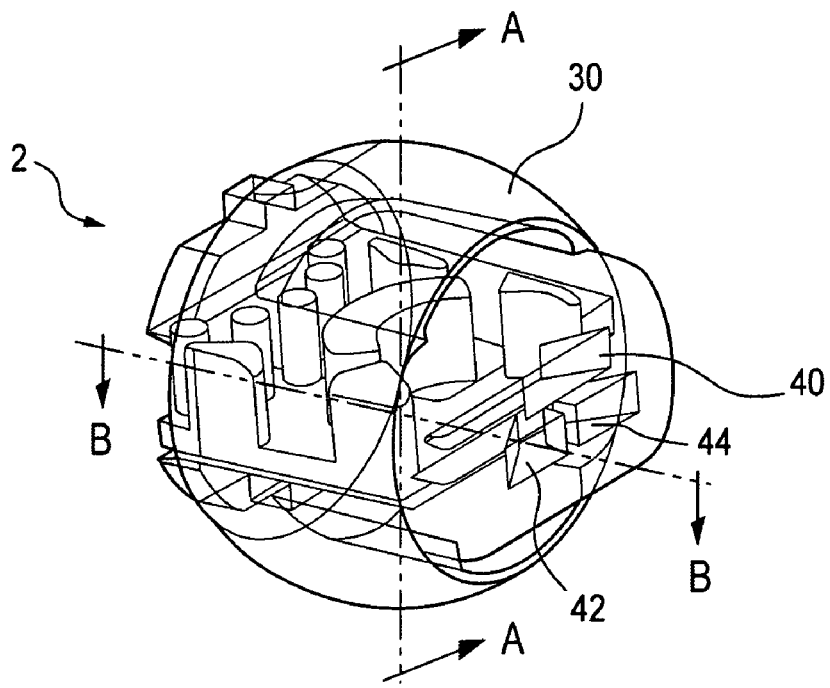
Figure 2B:
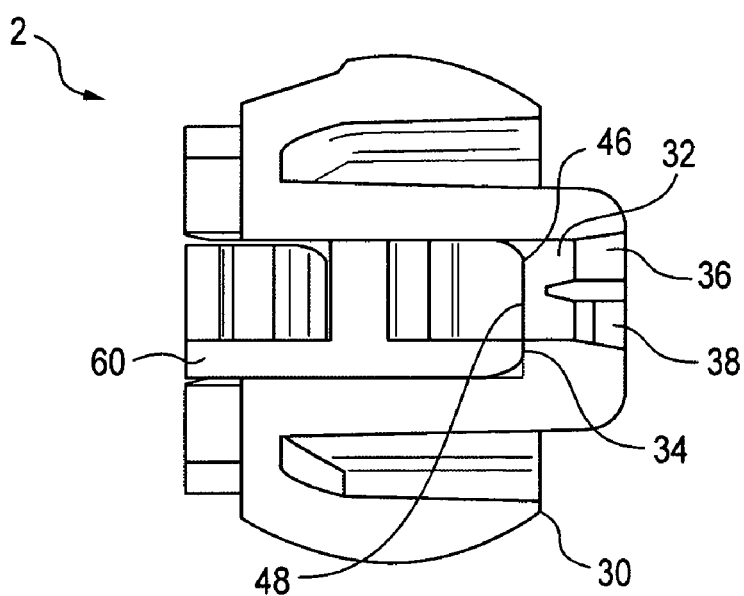

FIGS. 2A-2B show, respectively, a quasi-perspective and a cross-sectional view of a preferred embodiment of the present invention 2 in the form of a housing or enclosure 30 which has a front portion 32 into which has been molded a relatively large outlet 34 for the comparatively tall, upstream interaction chamber from which flows the liquid that issues from this outlet. A vertical 36 and a horizontal 38 splitter are used downstream of this outlet for effectively creating a two-tiered sprayer that has throats 40, 42, 44 and from which issue three component sprays, each of which has a centerline. The vertical splitter is seen to create a two-tiered (upper and lower spray components) pitched, output spray; while the horizontal splitter in its lower tier, similar to what we say in FIG. 1, imposes what we'll now refer to as a horizontal yaw angle on its right and left side component sprays.

Similarly to what was described in FIG. 1, the outlet's edges 46 serve to identify a herein defined oscillator outlet plane 48 that is generally perpendicular to the oscillator's centerline. The splitters' leading surfaces 50, 52 face generally in the upstream direction towards the interaction chamber and the splitters' front edges 54, 56 are situated a specified distance downstream of the outlet plane.

Figure 3A:
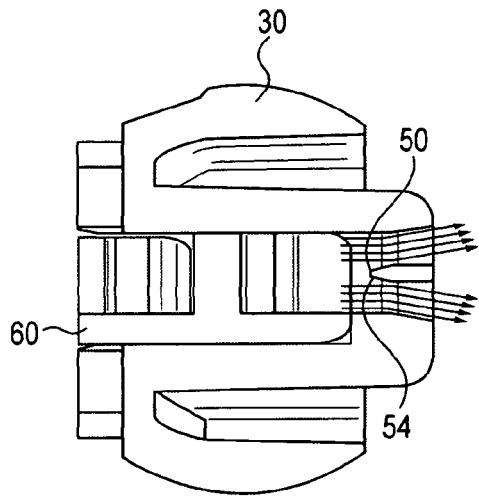
Figure 3B:
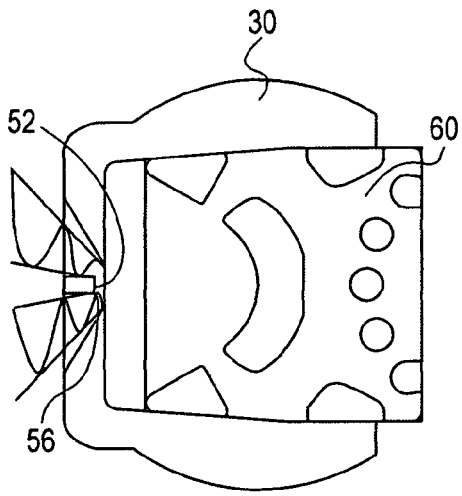

FIGS. 3A and 3B are, respectively, vertical and horizontal cross-sectional views of this housing and show the imposed splitter angles and an indication of the nature of the deflected or yawed component sprays from these lower throats.

Except for its interaction chamber not having the converging downstream sidewalls, the fluidic insert or oscillator 60 that is inserted into the rear of this housing is of a rather standard design.

It can be seen in FIGS. 2A-2B that this embodiment has an outer surface which has a portion that is spherically shaped. This housing is configured as such so that it can be used as the adjustable ball or secondary housing which is inserted into the primary housing of a windshield washer assembly.

Figure 4A:
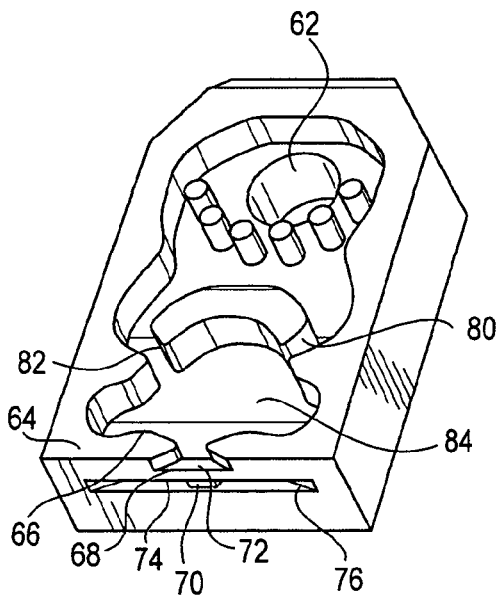
Figure 4B:
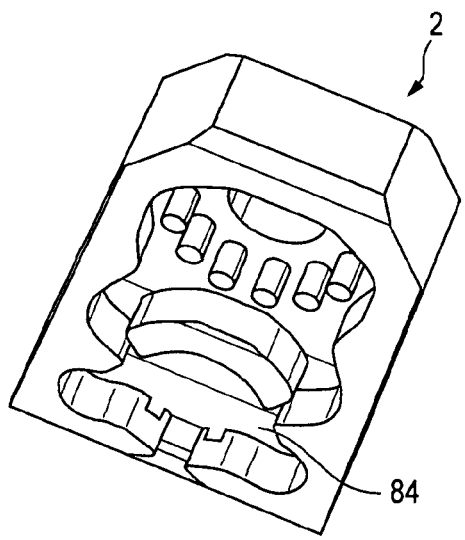
Figure 4C:
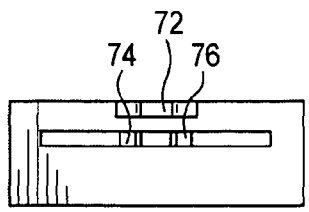

Another preferred embodiment of the present invention is the improved fluidic insert or oscillator 2 shown in FIGS. 4A-4C which is effectively a two-tiered and triple throated version of the illustrative oscillator shown in FIG. 1. Shown in FIGS. 4A-4C is a rectangular member that is molded or fabricated from plastic and has an especially-designed liquid flow channel or fluidic circuit fabricated into, in this instance, a first portion of its broader top surface (i.e., it could have been its bottom or side or some combination of these) and into which liquid flows from an inlet 62 in the insert's floor. This fluidic insert is of the type that is to be inserted into the cavity of a housing whose inner walls are configured to form a liquid-tight seal around the sidewalls of the insert.

This insert is seen to have a novel front wall 64 into which are molded an outlet 66 and a vertical 68 and horizontal 70 splitters. These split the flow into three effectively yawed throats 72, 74, 76. Two power nozzles 80, 82 direct their flow into the oscillator's interaction chamber 84.

Yet another preferred embodiment of the present invention is the improved fluidic insert or oscillator 2 shown in FIG. 5. This oscillator utilizes a downstream, round-shaped splitter 86 to again create two effective yawed throats 88A, 88B, with each issuing a component spray that has an imposed splitter yaw angle. The upstream fluidic circuitry is also different in that it takes the form of what is known as a "three-jet 90A, 90B, 90C island 92" oscillator as compared to the "two-jet" or "mushroom" oscillator shown in FIGS. 1-4.

The improved fluidic oscillator 160 is configured to be inserted and carried in an automotive windshield washing housing 130.

The prior state of the art for better spray distribution from automotive windshield washer devices often involved the use of "double spray" inserts or nozzles (i.e., two fluidic circuits on one insert, with the bottom circuit distributing fluid over a wide pattern toward the lower portion of the windshield and the top circuit distributing the spray over a smaller pattern toward the upper portion of the windshield). The limits of available fluid flow and pressure on automotive vehicles often required that each of these circuits have smaller dimensions than those of the single circuit devices which they were replacing. However, this type of configuration presented performance problems since such smaller oscillators cannot perform as well as larger oscillators in higher viscosity fluids, such as cold washer fluid.

An advantage of the present invention is that it allows for the use of a larger dimensioned insert or oscillator (e.g., such as would be used in a single spray application) to distribute fluid like the smaller oscillators used in the double insert housings, see U.S. Pat. No. 6,062,491. The larger dimensioned inserts of the present invention offer significantly improved spray patterns, such as the use of a vertical splitter to create a two-tiered spray, with its upper and lower pitched, component sprays, or the use of a horizontal splitter to create right-side and left-side yawed component sprays.

The foregoing is considered as illustrative only of the principles of the invention. Accordingly, all suitable modifications and equivalents of the present disclosure may be resorted to and still considered to fall within the scope of the invention as hereinafter set forth in claims to the present invention.

We claim:

1. An improved fluidic oscillator that operates on a pressurized liquid flowing through said oscillator to generate an oscillating spray of liquid droplets into a surrounding gaseous environment, said oscillator of the type having a centerline, an interaction chamber and a means for inducing oscillations in said liquid flowing through said chamber, said chamber having sidewalls that extend downstream and converge towards said oscillator centerline so as to form an outlet for said oscillator, wherein the improvement comprises:

a splitter having a generally flat surface with a first and second edge, said surface facing generally in the upstream direction towards said interaction chamber, wherein said oscillator outlet having a first and a second edge, each of which are laterally spaced away from said oscillator centerline and serve to define an oscillator outlet plane that is generally perpendicular to said oscillator centerline, said first splitter edge situated a first specified distance downstream of said oscillator outlet plane and said second splitter edge situated a second specified distance downstream of said oscillator outlet plane, said first splitter edge cooperating with said outlet first edge to cause a portion of the liquid that flows through said outlet to split into a first component spray that flows between said first splitter and outlet edges, said first component spray having a centerline that has an imposed, first splitter angle relative to said oscillator centerline, and said second splitter edge cooperating with said outlet second edge to cause a portion of the liquid that flows through said outlet to split into a second component spray that flows between said second splitter and outlet edges, said second component spray having a centerline that has an imposed, second splitter angle relative to said oscillator centerline.

2. The improved fluidic oscillator as recited in claim 1, wherein said spray being characterized by properties such as its fan angle, mean exit velocity and the uniformity of the spatial distribution of its droplets, and wherein said imposed splitter angles are chosen so as to alter said properties of said oscillating spray so that at least one of said spray properties assumes a desired value.

3. The improved fluidic oscillator as recited in claim 1, wherein said splitter is in the form of a horizontal splitter and oriented with respect to said oscillator centerline so as to split said flow into yawed, right- and left-side spray components.

4. The improved fluidic oscillator as recited in claim 1, wherein said splitter is in the form of a vertical splitter and oriented with respect to said oscillator centerline so as to split said flow into a two-tiered flow having pitched, upper and lower spray components.

5. The improved fluidic oscillator as recited in claim 1, where said first and second splitter edge specified distances downstream of said oscillator outlet plane are approximately equal.

6. The improved fluidic oscillator as recited in claim 1, wherein, to produce a spray with a larger overall fan angle, said imposed splitter angles are in the range of 5 to 45 degrees.

7. The improved fluidic oscillator as recited in claim 1, wherein said means for inducing oscillations in said liquid flowing through said chamber includes a power nozzle.

8. An improved fluidic oscillator that operates on a pressurized liquid flowing through said oscillator to generate an oscillating spray of liquid droplets into a surrounding gaseous environment, said oscillator of the type having a centerline, an interaction chamber and a means for inducing oscillations in said liquid flowing through said chamber, wherein the improvement comprises:

an enclosure for said oscillator, said enclosure having an interior surface that includes sidewalls which attach to said interaction chamber so as to form an outlet for said oscillator, said outlet having edges that serve to define an oscillator outlet plane that is generally perpendicular to said oscillator centerline, a splitter located in said enclosure interior surface, said splitter having a generally flat surface with edges, said splitter surface facing generally in the upstream direction towards said interaction chamber, and with said splitter edges situated a specified distance downstream of said oscillator outlet plane, said splitter edges cooperating with said outlet edges to split the liquid that flows through said outlet into component sprays that flow between said splitter and outlet edges, and each of said component sprays having a centerline that, because of the relative orientation of said splitter and outlet edges, has an imposed splitter angle relative to said oscillator centerline.

9. The improved fluidic oscillator as recited in claim 8, wherein said spray being characterized by properties such as its fan angle, mean exit velocity and the uniformity of the spatial distribution of its droplets, and wherein said imposed splitter angles are chosen so as alter said properties of said oscillating spray so that at least one of said spray properties assumes a desired value.

10. The improved fluidic oscillator as recited in claim 8, wherein said splitter is in the form of a horizontal splitter and oriented with respect to said oscillator centerline so as to split said flow into yawed, right- and left-side spray components.

11. The improved fluidic oscillator as recited in claim 8, wherein said splitter is in the form of a vertical splitter and oriented with respect to said oscillator centerline so as to split said flow into a two-tiered flow having pitched, upper and lower spray components.

12. The improved fluidic oscillator as recited in claim 8, wherein, to produce a spray with a larger overall fan angle, said imposed splitter angles are in the range of 5 to 45 degrees.

13. The improved fluidic oscillator as recited in claim 8, wherein said means for inducing oscillations in said liquid flowing through said chamber includes a power nozzle.

14. An improved fluidic oscillator that operates on a pressurized liquid flowing through said oscillator to generate an oscillating spray of liquid droplets into a surrounding gaseous environment, said oscillator of the type having a centerline, an interaction chamber and a means for inducing oscillations in said liquid flowing through said chamber, said chamber having sidewalls that extend downstream and converge towards said oscillator centerline so as to form an outlet for said oscillator and said outlet having edges that serve to identify an oscillator outlet plane that is generally perpendicular to said oscillator centerline, wherein the improvement comprises:

a vertical splitter having a generally flat surface facing generally in the upstream direction and terminating in opposing flat surface edges, said splitter being situated in said oscillator outlet and apart from said oscillator outlet edges so that said splitter serves to split said flow from said oscillator outlet into a two-tiered flow having upper and lower spray components.

15. The improved fluidic oscillator as recited in claim 8, wherein said enclosure has a front portion which has been molded to include said outlet for said interaction chamber.

16. The improved fluidic oscillator as recited in claim 15, wherein a vertical and a horizontal splitter are downstream of said outlet for effectively creating a two-tiered sprayer that has first, second and third throats from which issue first, second and third component sprays, each of which has a centerline.

17. The improved fluidic oscillator as recited in claim 8, wherein said component sprays have an average exit velocity of at least 13 m/s.

18. The improved fluidic oscillator as recited in claim 17, wherein said component sprays have an exit velocity of at least 15 m/s.

19. The improved fluidic oscillator as recited in claim 8, wherein said improved oscillators provide larger overall horizontal fan angles than standard oscillators for a given Area Ratio in the range of 5 to 45 degrees, and so provide reduced visual impact as compared to standard oscillators.

20. The improved fluidic oscillator as recited in claim 19, wherein said oscillator is configured for use in automotive or windshield washer applications wherein said oscillator is carried in automotive windshield washing housing.

* * * * *